(12) United States Patent
Wang et al.

(10) Patent No.: US 10,187,451 B2
(45) Date of Patent: *Jan. 22, 2019

(54) METHOD, MOBILE DEVICE AND SYSTEM FOR TRANSMITTING FILES

(71) Applicant: TENCENT TECHNOLOGY (SHENZHEN) COMPANY LIMITED, Shenzhen (CN)

(72) Inventors: Qing Wang, Shenzhen (CN); Zhanghu Luo, Shenzhen (CN); Zefeng Huang, Shenzhen (CN); Haoran Guo, Shenzhen (CN); Quanhao Xiao, Shenzhen (CN); Yixia Yuan, Shenzhen (CN); Jiashun Song, Shenzhen (CN); Pengtao Li, Shenzhen (CN); Yunfeng Dai, Shenzhen (CN); Xunchang Zhan, Shenzhen (CN); Chunyou Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 107 days.

This patent is subject to a terminal disclaimer.

(21) Appl. No.: 15/613,305

(22) Filed: Jun. 5, 2017

(65) Prior Publication Data

US 2017/0272502 A1 Sep. 21, 2017

Related U.S. Application Data

(63) Continuation of application No. 14/496,075, filed on Sep. 25, 2014, now Pat. No. 9,705,961, which is a
(Continued)

(30) Foreign Application Priority Data

Mar. 27, 2012 (CN) .......................... 2012 1 0084393

(51) Int. Cl.
  *H04L 29/08* (2006.01)
  *H04W 36/26* (2009.01)

(52) U.S. Cl.
  CPC ............ *H04L 67/06* (2013.01); *H04W 36/26* (2013.01)

(58) Field of Classification Search
  CPC .... H04L 69/329; H04L 65/4084; H04L 67/06
  See application file for complete search history.

(56) References Cited

U.S. PATENT DOCUMENTS 6,549,914 B1 4/2003 Valys
7,529,835 B1 5/2009 Agronow et al.
(Continued)

FOREIGN PATENT DOCUMENTS

CN 101146319 A 3/2008
CN 101227290 A 7/2008
(Continued)

OTHER PUBLICATIONS

International Search Report in Application No. PCT/CN2013/072996 dated Jun. 6, 2013.
(Continued)

*Primary Examiner* — Ranodhi Serrao
(74) *Attorney, Agent, or Firm* — Marshall, Gerstein & Borun LLP (57) ABSTRACT

A method, a mobile device, and system for transmitting files are disclosed. The method includes: a first mobile device transmits a file to a second mobile device in a first transmission mode when receiving a file transmission request for transmitting the file to the second terminal from a user. In the process of transmitting the file, the first mobile device judges in real-time whether the size of the remaining part of the file is greater than or equal to a preconfigured threshold whether the first mobile device is able to establish a connection with
(Continued)

the second mobile device with a higher transmission rate than that in the first transmission mode. On condition that the above condition is satisfied, the first mobile device adopts the second transmission mode to transmit the remaining part of the file.

14 Claims, 6 Drawing Sheets

Related U.S. Application Data continuation of application No. PCT/CN2013/072996, filed on Mar. 21, 2013.

(56) References Cited

U.S. PATENT DOCUMENTS

| | | | |
|---|---|---|---|
| 9,456,021 | B2 | 9/2016 | Chakra et al. |
| 9,519,728 | B2 | 12/2016 | Rieger et al. |
| 9,576,070 | B2 | 2/2017 | Steiner et al. |
| 2002/0116518 | A1 | 8/2002 | Silen et al. |
| 2003/0069881 | A1 | 4/2003 | Huttunen |
| 2006/0274869 | A1 | 12/2006 | Morse |
| 2008/0166967 | A1 | 7/2008 | McKillop |
| 2011/0138064 | A1 | 6/2011 | Rieger et al. |
| 2012/0192080 | A1 | 7/2012 | Lloyd |
| 2015/0207843 | A1 | 7/2015 | Chakra |
| 2015/0269131 | A1 | 9/2015 | Minematsu et al. |
| 2015/0310126 | A1 | 10/2015 | Steiner et al. |
| 2016/0337436 | A1 | 11/2016 | Chakra et al. |

FOREIGN PATENT DOCUMENTS

| | | |
|---|---|---|
| CN | 101325769 A | 12/2008 |
| CN | 102340792 A | 2/2012 |
| CN | 102404093 A | 4/2012 |

OTHER PUBLICATIONS

Office Action in Chinese Application No. 201210084393.X dated Dec. 31, 2014.
International Preliminary Report on Patentability and Written Opinion in International Application No. PCT/CN2013/072996 dated Oct. 1, 2014.
Written Opinion in Singapore Application No. 11201405441X dated Mar. 15, 2016, 5 pages.

The first mobile device     The second mobile device

METHOD, MOBILE DEVICE AND SYSTEM FOR TRANSMITTING FILES

CROSS REFERENCE

The application is a continuation of a U.S. application Ser. No. 14/496,075, which is a continuation of an International application No PCT/CN2013/072996 and claims the benefit of a Chinese Patent Application No. 201210084393.X, filed on Mar. 27, 2012, the disclosure of which is incorporated herein in its entirety by reference.

TECHNICAL FIELD

The present disclosure relates to communication technology, and particularly to a method, mobile device and system for transmitting files.

BACKGROUND

With the development of wireless communication technology, nowadays mobile devices have enabled file transmission through wireless communication technology. However, existing solutions of file transmission have respective ranges of application. Therefore it is particularly important to choose suitable transmission modes according to the characteristics of files to be transmitted.

Conventionally, there are two technical solutions for file transmission between mobile devices. The first solution is to transmit files through Bluetooth. Turn on the Bluetooth on two mobile devices, search automatically, and transmit files after having found the opposite terminal. The second solution is by way of Wireless Fidelity (WIFI). Activate WIFI on both terminals, connect both terminals to a wireless local area network (WLAN) through WIFI, find the opposite terminal, and then transmit files to the opposite terminal through software such as Internet Protocol (IP) Messenger.

In the course of invention, the inventor found the following defects of the existing technical solutions. In the first solution, transmitting files through Bluetooth has a very limited rate, which extremely limits the efficiency of file transmission. While in the second solution, the rate is also low when the WIFI signal quality is poor, which also limit the efficiency of file transmission.

SUMMARY

To improve the transmission efficiency, embodiments of the present invention are to provide a method, mobile device and system for transmitting files. The technical scheme is as follows:

An example of the invention is implemented as a method for transmitting files performed by a first mobile device, and the method includes:

receiving a request for transmitting a file to a second mobile device from a user;

transmitting the file to the second mobile device in a first transmission mode;

judging whether the first mobile device is able to connect with the second mobile device in a second transmission mode, and whether the transmission rate in the second transmission mode is higher than that in the first transmission mode;

switching the transmission mode of the first mobile device to the second transmission mode to transmit the remaining part of the file on condition that the first mobile device is able to connect with the second mobile device in a second transmission mode, and the transmission rate in the second transmission mode is higher than that in the first transmission mode; and displaying in real-time the remaining part of the file on a screen during the process of transmitting the file until the file transmission is complete.

Another example of the present invention is to provide a mobile device which includes:

a receiving module, to receive a request for transmitting a file from a user;

a transmitting module, to send the file to a second mobile device after receiving the request;

a judging module, to determine whether the first mobile device is able to establish a connection with the second mobile device under the second transmission mode and whether the transmission rate of the second transmission mode is higher than that of the first transmission mode;

a switching module, to switch the transmission mode of the mobile device to the second transmission mode to transmit the remaining part of the file after the judging module decides that the first mobile device is able to connect with the second mobile device in a second transmission mode, and the transmission rate in the second transmission mode is higher than that in the first transmission mode; and a display module, configured to display in real-time the remaining part of the file on the screen during the process of transmitting the file until the file transmission is complete.

Another example of the present invention is to provide a mobile device, which comprises:

one or more processors;

a memory; and one or more programs stored in the memory and to be executed by the one or more processors, the one or more programs comprise instructions to:

receive a request for transmitting a file to a second mobile device from a user;

transmit the file to the second mobile device in a first transmission mode;

judge whether the first mobile device is able to establish a connection with the second mobile device in a second transmission mode and whether the transmission rate of the second transmission mode is higher than that of the first transmission mode;

switch the transmission mode of the first mobile device to the second transmission mode to transmit the remaining part of the file on condition that the first mobile device is able to establish a connection with the second mobile device in the second transmission mode and the transmission rate of the second transmission mode is higher than that of the first transmission mode; and display the remaining part of the file in real-time on a screen in the process of transmitting the file until the entire file transmission is complete.

Another example of the present invention is to provide a computer-readable storage medium, which contains one or more programs. These programs could be executed by one or more processors to carry out the methods in any of the embodiments.

Technical schemes provided by the embodiments have the following beneficial effects:

when the first mobile device is transmitting a file to the second mobile device in a first transmission mode, the first mobile device judges in real-time whether the size of the remaining part of the file is greater than or equal to the preconfigured threshold, and whether it could establish a connection in a second transmission mode with the second mobile device with a higher transmission rate than that in the first transmission mode. If yes, the first mobile device switches the transmission mode of the first mobile device and transmits the remaining part of the file in the second transmission mode, thus smart selection of transmission mode for file transmission according to the size of remaining file and transmission rate can be achieved and the transmission efficiency can be achieved.

This automatic selection of transmission mode for the user simplifies the user's operation procedures and increases convenience for the users. Furthermore, the request sent by the user by dragging the open and displayed file out of the screen to send the file can be supported and a real-time display of the remaining part of the file on the screen which visualizes the process of file transmission for users can also be supported. Therefore, user experiences would be enhanced.

BRIEF DESCRIPTION OF DRAWINGS

In order to illustrate the technical scheme of the present disclosure, hereafter a brief introduction would be given to the figures used in the detailed description of embodiments. Obviously, figures below are merely some of the embodiments of the present disclosure. For those skilled in the art, they could obtain other figures basing on the current figures without any creative work.

DETAILED DESCRIPTION

Examples will now be described more fully with reference to the accompanying drawings.

File transmitting in the present disclosure in particular refers to file transmitting between mobile devices. The referred mobile devices include but not limited to mobile phones, tablet PC, PDA and so forth. The referred types of mobile devices could be either a keyboard type or a touch screen type. The present disclosure has no particular limits. When transmitting file between two mobile devices, we could define one mobile device as a first mobile device and the other as a second mobile device. Different designation has nothing to do with the quality of mobile devices, and this will not be further clarified hereinafter. The file transmitted between mobile devices could be any type, including but not limited to pictures, documents, audios, videos and so forth. The present disclosure has no particular limits.

Embodiment I

Figure 1:
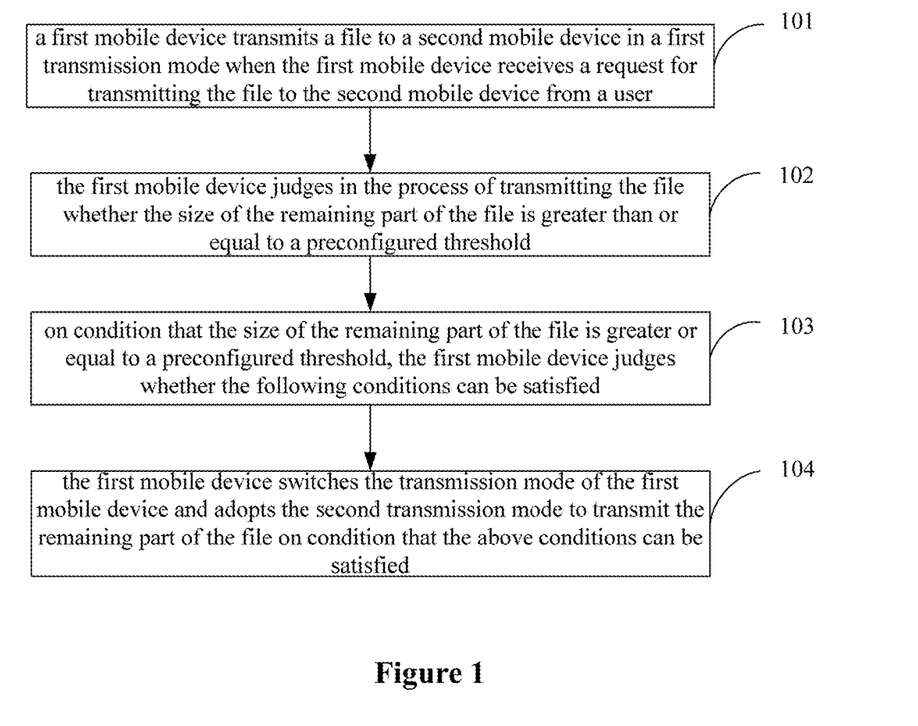
FIG. 1 illustrates a flow chart of a method for transmitting files in Embodiment I of the present disclosure.

Referring to FIG. 1, the embodiment provides a method for transmitting files, specific steps as follows:

101: a first mobile device transmits a file to a second mobile device when the first mobile device receives a request for transmitting the file to the second mobile device from a user.

102: the first mobile device judges in the process of transmitting the file whether the size of the remaining part of the file is greater than or equal to a preconfigured threshold.

103: on condition that the size of the remaining part of the file is greater or equal to a preconfigured threshold, the first mobile device judges whether the following conditions can be satisfied: the first mobile device is able to connect with the second mobile device in a second transmission mode, and the transmission rate in the second transmission mode is higher than that in the first transmission mode.

104: the first mobile device switches the transmission mode of the first mobile device and adopts the second transmission mode to transmit the remaining part of the file on condition that the above conditions can be satisfied.

In the above method, the first mobile device may confirm to have received the request for transmitting the file to the second mobile device sent by the user:

when the first mobile device detects that the user has pressed a send file button to perform an operation of transmitting a file, the request for transmitting the file to the second mobile device is confirmed; or when the first mobile device detects that the user has touched and dragged the file outside a display area of a screen, the first mobile device judges whether an operation mode of the file is a sending mode or a browse mode; and if the operation mode of the file is the sending mode, the request for transmitting the file to the second mobile device is confirmed.

In the above method, the step of transmitting the file to the second mobile device in the first transmission mode may include:

the first mobile device transmits the file to the second mobile device in a default transmission mode of the first mobile device, i.e. the first transmission mode;

the first mobile device transmits the file to the second mobile device in a manually selected transmission mode (i.e. the first transmission mode) before the user send the request of file transmission; or the first mobile device selects automatically a transmission mode as the first transmission mode and transmits the file to the second mobile device in the first transmission mode selected.

Preferably, the method may further include:

displaying in real-time the remaining part of the file on a screen during the process of transmitting the file until the file transmission is complete on condition that the file is opened and displayed when the user send the request.

To further illustrate, the first transmission mode can be Bluetooth and the second transmission mode can be WIFI or WAPI.

Optionally, the step of the first mobile device judging in the process of transmitting the file whether the size of the remaining part of the file is greater than or equal to a preconfigured threshold may include:

judging in the process of transmitting the file whether the first mobile device keeps a connection with the second mobile device, and whether the size of the remaining part of the file is greater than or equal to the preconfigured threshold;

on condition that the first mobile device keeps connection with the second mobile device in the first transmission mode and the size of the remaining part of the file is greater than or equal to the preconfigured threshold, proceeding to the step of judging whether the above conditions can be satisfied;

on condition that the first mobile device disconnect with the second mobile device in the first transmission mode, judging whether the first mobile device could establish a connection with the second mobile device in the second transmission mode; and on condition that the first mobile device can establish a connection with the second mobile device in the second transmission mode, switching the first transmission mode to the second transmission mode to transmit the remaining part of the file.

In the method provided in the embodiment, when the first mobile device is transmitting a file to the second mobile device in the first transmission mode, the first mobile device judges in real-time whether the size of the remaining part of the file is greater than or equal to the preconfigured threshold, and whether it could establish a connection in the second transmission mode. If yes, the first mobile device switches the transmission mode and transmits the remaining part of the file in the second transmission mode, thus smart selection of transmission mode for file transmission according to the size of remaining part of the file and transmission rate can be achieved and the transmission efficiency can be achieved.

In addition, the automatic selection of transmission mode for the user simplifies the user's operation procedures and increases convenience for the users. Furthermore, the request sent by the user by dragging the open and displayed file out of the screen to send the file can be supported and a real-time display of the remaining part of the file on the screen which visualizes the process of file transmission for users can also be supported. Therefore, user experiences would be enhanced.

Embodiment II

Figure 2:
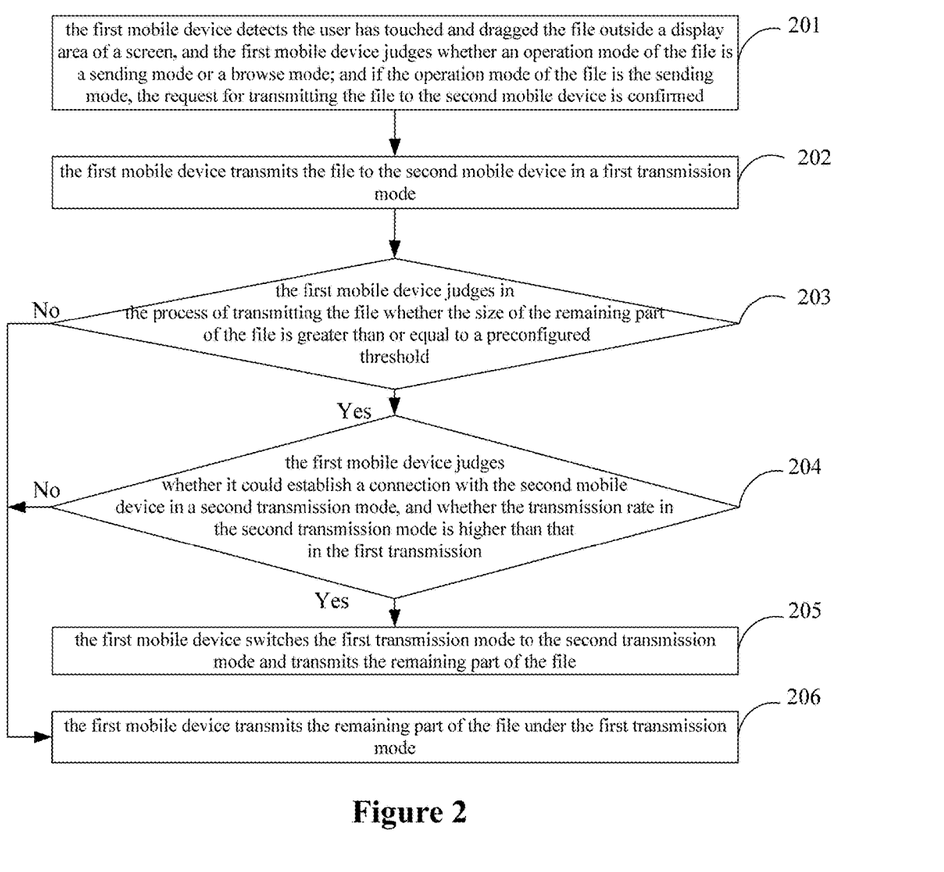
FIG. 2 illustrates a flow chart of a method for transmitting files in Embodiment II of the present disclosure.

Referring FIG. 2, the embodiment provides a method for transmitting files, and specific steps as follows:

201: the first mobile device detects that the user has touched and dragged the file outside a display area of a screen, and the first mobile device judges whether an operation mode of the file is a sending mode or a browse mode; and if the operation mode of the file is the sending mode, the request for transmitting the file to the second mobile device is confirmed.

In the embodiment, a touchscreen mobile device is cited as example for the first mobile device. In practical applications, the first mobile device can also be keyboard mobile device, in which scenario step 201 could be replaced by the following steps:

when the first mobile device detects that the user has pressed a send file button to perform an operation of transmitting a file, the request for transmitting the file to the second mobile device is confirmed. Specifically, the first mobile device could provide a send file button in the menu of the request file for the user, and on condition that the user has pressed the send file button, then transmit the file to the second mobile device. The present disclosure will not further elaborate on the specific implementation process.

In the embodiment, the browse mode and the sending mode refer to two modes of operation provided by the first mobile device to the user. The browse mode refers to a mode that the user browses the file. In the mode, touching and dragging the file are deemed as an operation of page turning. For example, when an iPhone user browses pictures in a browse mode, sliding finger to the right turns a page and continues browsing. The sending mode refers to a mode that the user executes a file sending operation. In the mode, touching and dragging the file are deemed as a request of transmitting the file. For example, when an iPhone user opens a picture and chooses the sending mode, the operation of sliding finger to the edges triggers a file transmitting operation.

Wherein the first mobile device could let the user choose between the browse mode and the sending mode by setting virtual keys at the interface. For example, setting two virtual keys, one for the browse mode and the other for the sending mode, the user chooses according to his/her actual needs; or, setting a mode switching virtual key, clicking to choose the browse mode and clicking again to switch to the sending mode and so forth. The present disclosure has no particular limits.

202: the first mobile device transmits the file to the second mobile device in a first transmission mode.

Specifically, the first mobile device establishes a connection with the second mobile device in the first transmission mode, and transmits the file to the second mobile device in the first transmission mode. When the first mobile device establishes a connection with the second mobile device, the first mobile device has to search and identify the second mobile device. The first mobile device can establish a connection with the second mobile device in various ways like setting a password. The present disclosure has no particular limits on that.

In addition, in the present step, the first mobile device could transmit the file to the second mobile device through any of the following three modes:

the first mobile device sets the first transmission mode as a default transmission mode in advance, and transmits the file to the second mobile device in the default transmission mode; or, the first mobile device user manually selects a transmission mode as the first transmission mode before the user sends the request of file transmission, transmits the file to the second mobile device in the manually selected transmission mode; or the first mobile device automatically selects a transmission mode as the first transmission mode and transmits the file to the second mobile device accordingly; in this case, the first mobile device sets the automatic selection rules in advance, including automatically select a transmission mode with a higher transmission rate, or automatically select the Bluetooth on condition that the distance between two mobile devices is less than the assigned distance and so forth. The present disclosure has no particular limits on that.

When transmitting files, the first mobile device would encode the file into binary data stream and transmit the binary data stream to the second mobile device; the second mobile device receives the binary data stream and decodes the binary data stream.

203: the first mobile device judges in the process of transmitting the file whether the size of the remaining part of the file is greater than or equal to a preconfigured threshold. If yes, proceed to step 204; otherwise, proceed to step 206.

In the embodiment, the preconfigured threshold refers to a pre-assigned critical value of file size. When the size of the remaining part of the file in the transmitting process is greater than or equal to the preconfigured threshold, it means the remaining part of the file is still large and requires a faster transmission mode so as to improve transmission efficiency; when the size of the remaining part of the file in the transmitting process is smaller than the preconfigured threshold, it means the remaining part of the file is small and transmission could be soon completed under the current transmission mode, and transmission mode does not need to be switched.

For example, for some small files, transmission can be completed very quickly in Bluetooth, and then WIFI transmission does not need to be switched on thus avoiding unnecessary switching process.

204: the first mobile device judges whether it could establish a connection with the second mobile device under a second transmission mode, and whether the transmission rate in the second transmission mode is higher than that in the first transmission. If yes, proceed to step 205; otherwise, proceed to step 206.

In the embodiment, the first transmission mode and the second transmission mode include but not limited to: Bluetooth, WIFI or WAPI, in which the transmission rate of the second transmission mode is higher than that of the first transmission mode. The present disclosure has no particular limits on that. Preferably, the first transmission mode can be Bluetooth, and the second transmission mode can be WIFI or WAPI.

Bluetooth is a short-range wireless communication technology with a communication range of about 10 meters. It adopts a decentralized network structure, fast frequency-hopping technology and short package technology, which support point-to-point and point-to-multipoint communications. For the reason that Bluetooth automatically searches available Bluetooth terminals in current environment, in order to define the identity of the Bluetooth terminal, we have to establish a connection with the Bluetooth terminal before transmitting a file through Bluetooth, which means a personal identification code need to be utilized to ensure the security of connection, for example, setting digital code to match and connect.

WIFI is a short-range wireless communication technology with a high transmission rate and a wide signal coverage range, but is relatively poor in terms of data security.

WAPI is a short-range wireless communication technology. Comparing with WIFI, WAPI has replaced the original identification mechanism and security mechanism with pre-shared keys and certificates as well as SMS4 encryption (sectionalized encryption) to enhance the wireless LAN security.

205: the first mobile device switches the first transmission mode to the second transmission mode and transmits the remaining part of the file. The above process completes.

Specifically, if the second transmission mode is WIFI or WAPI, the first mobile device would obtain the IP address of the second mobile device after the first mobile device establishes a connection with the second mobile device through WIFI or WAPI. The first mobile device would analyze the IP address based on ARP (Address Resolution Protocol) and convert the IP address to a MAC address, and transmits the remaining part of the file according to the MAC address.

206: the first mobile device transmits the remaining part of the file under the first transmission mode. Till now the above process completes.

In the embodiment, the method can further include the following steps:

the first mobile device displays in real-time the remaining part of the file on the screen during the process of transmitting the file until the file transmission is complete on condition that the file is opened and displayed when the user send the request.

Figure 3:
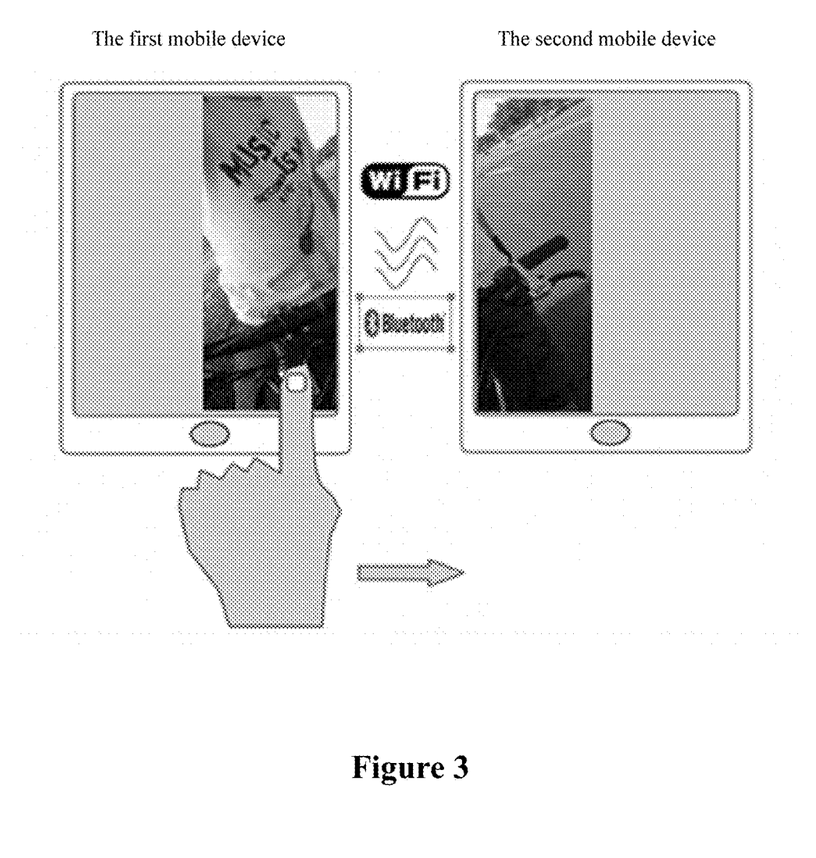
FIG. 3 illustrates an interface sketch of transmitting files between mobile devices in Embodiment II of the present disclosure.

Specifically, pictures are used as an example of file to explain the process. See also in FIG. 3. If a picture is opened and displayed when the user send the picture, and one third of the picture has been dragged out of the screen of the first mobile device, the first mobile device encodes the one third of the picture into binary data stream and transmits to the second mobile device. Simultaneously, the first mobile device would display in real-time the remaining two thirds of the picture. On the other hand, after receiving the one third of the picture, the second mobile device could decode the binary data stream and display the one third of the picture in real-time. Therefore, user experience would be enhanced.

Figure 4:
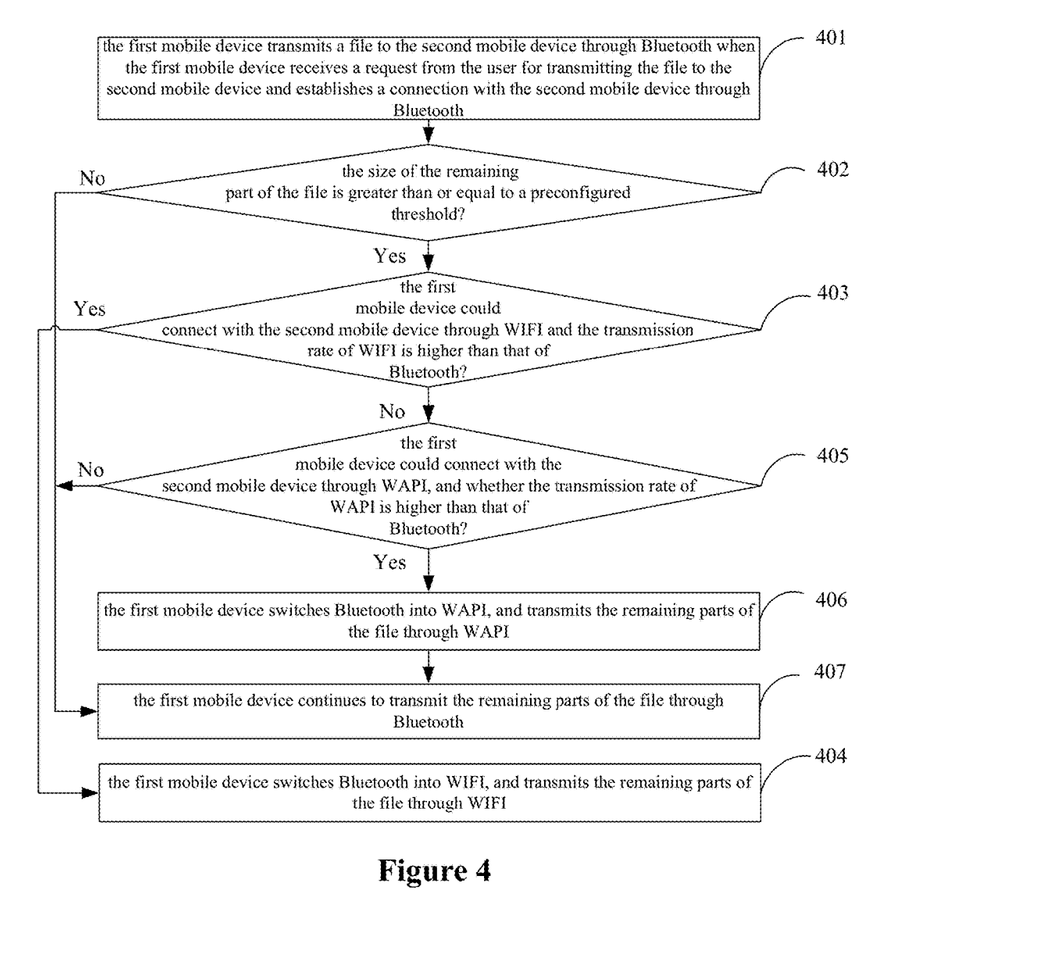
FIG. 4 illustrates a flow chart of a second method for transmitting files in Embodiment II of the present disclosure.

Now an example is cited by using Bluetooth as the first transmission mode and WIFI as the second transmission mode for transmitting files to give a more detailed description. See also FIG. 4. The embodiment provides a method of transmitting file, specific steps as follows:

401: the first mobile device transmits a file to the second mobile device through Bluetooth when the first mobile device receives a request from the user for transmitting the file to the second mobile device and establishes a connection with the second mobile device through Bluetooth.

Specifically, the first mobile device searches a list of all the available Bluetooth terminals through Bluetooth, and finds the second mobile device and requests to establish a connection. Simultaneously, the first mobile device enters a user-defined code, and tells the code to the second mobile device. When the second mobile device receives the request of connection establishment, the second mobile device enters the code. After verifying that the codes entered in the two mobile devices are the same, the connection establishment completes.

402: the first mobile device judges in the process of transmitting the file whether the size of the remaining part of the file is greater than or equal to a preconfigured threshold. If yes, proceed to step 403; otherwise, proceed to step 405.

403: the first mobile device judges whether the first mobile device could connect with the second mobile device through WIFI, and whether the transmission rate of WIFI is higher than that of Bluetooth. If yes, proceed to step 404; otherwise, proceed to step 405.

The basic equipment of wireless LAN includes at least a WLAN card and an AP (Access Point). The first mobile device equals to a WLAN card. Hence, the first mobile device accesses to a wireless LAN through an AP, judging whether it could find the IP address of the second mobile device in the wireless LAN, and judge accordingly whether the first mobile device could establish a connection with the second mobile device through WIFI.

404: the first mobile device switches Bluetooth into WIFI, and transmits the remaining parts of the file through WIFI. The above process completes.

405: the first mobile device judges whether the first mobile device could connect with the second mobile device through WAPI, and whether the transmission rate of WAPI is higher than that of Bluetooth. If yes, proceed to step 406; otherwise, proceed to step 407.

Specifically, the first mobile device would obtain the IP address of the second mobile device after the first mobile device establishes a connection with the second mobile device. The first mobile device would analyze the IP address based on ARP and convert the IP address to a MAC address, and transmits the remaining part of the file according to the MAC address.

406: the first mobile device switches Bluetooth into WAPI, and transmits the remaining parts of the file through WAPI. The above process completes.

407: the first mobile device continues to transmit the remaining parts of the file through Bluetooth. The above process completes.

In the embodiment, in the step 203 or step 402, the step of the first mobile device judging in the process of transmitting the file whether the size of the remaining part of the file is greater than or equal to a preconfigured threshold in real-time specifically includes:

judging during the process of transmitting the file by the first mobile device whether the first mobile device keeps a connection with the second mobile device, and whether the size of the real-time remaining part of the file is greater than or equal to the preconfigured threshold; if the first mobile device keeps the connection with the second mobile device in the first transmission mode and the size of the remaining part of the file is greater than or equal to the preconfigured threshold, executing the step of judging whether the first mobile device could satisfy the conditions; if the first mobile device disconnect with the second mobile device in the first transmission mode, judging whether the first mobile device could establish a connection with the second mobile device in the second transmission mode; if yes, switches the first transmission mode to the second transmission mode for transmitting the remaining part of the file.

For example, the first mobile device transmits a file through WIFI, and it possesses both the functions of WAPI and Bluetooth. If the first mobile device could keep a connection with the second mobile device through WIFI, judge whether the size of the real-time remaining part of the file is greater than or equal to the preconfigured threshold and execute the corresponding step; if the first mobile device disconnect with the second mobile device in the mode of WIFI, judge whether the first mobile device could establish a connection with the second mobile device in another transmission mode, and since WAPI normally has a higher transmission rate than Bluetooth, preferably judge whether connection could be established with the second mobile device in WAPI mode. If the first mobile device could establish a connection with the second mobile device through WAPI, switch to WAPI for transmitting the remaining part of the file. If the first mobile device could not establish a connection with the second mobile device through WAPI, judging whether the first mobile device could establish a connection with the second mobile device through Bluetooth, and if yes, switch to WAPI for transmitting the remaining part of the file.

In the method of transmitting files in the embodiment, the first mobile device judges in real-time whether the size of the remaining part of the file is greater than or equal to the preconfigured threshold, and whether it could establish a connection in the second transmission mode and whether the transmission rate of the second transmission mode is higher than that of the first transmission mode when the first mobile device is transmitting a file to the second mobile device in the first transmission mode. If yes, the first mobile device switches the transmission mode and transmits the remaining part of the file in the second transmission mode, thus a smart selection of transmission mode for file transmission according to the size of remaining file and transmission rate can be achieved and the transmission efficiency can be enhanced.

In addition, the automatic selection of transmission mode for the user simplifies the user's operation procedures and increases convenience for the users. Furthermore, the request sent by the user by dragging the open and displayed file out of the screen to send the file can be supported and a real-time display of the remaining part of the file on the screen which visualizes the process of file transmission for users can also be supported. Therefore, user experiences would be enhanced.

Embodiment III

Figure 5:
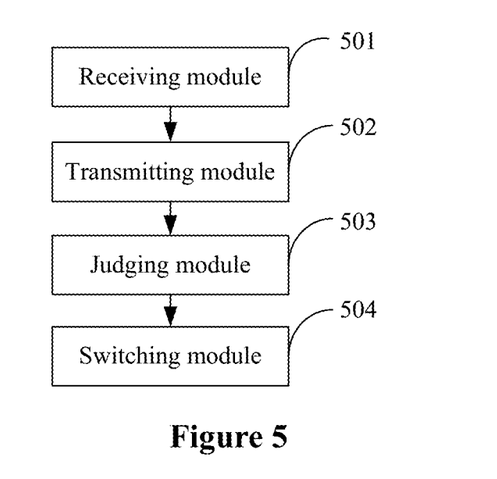
FIG. 5 illustrates a structure diagram of a mobile device provided in Embodiment III of the present disclosure.

Referring to FIG. 5, the embodiment provides a mobile device, including:

a receiving module 501, configured to receive a request for transmitting a file from a user;

a transmitting module 502, configured to transmit a file to a second mobile device in a first transmission mode when the receiving module 501 receives a request;

a judging module 503, configured to judge in real-time whether the size of the remaining part of the file is greater than or equal to a preconfigured threshold when the transmitting module 502 transmits a file; on condition that the size of the remaining part of the file is greater than or equal to a preconfigured threshold, judge whether the following conditions can be satisfied: the first mobile device is able to establish a connection in a second mobile device, and the transmission rate in the second transmission mode is higher than that in a first transmission mode; and a switching module 504, configured to switch the transmission mode of the mobile device after the judging module decides that the mobile device satisfies all the conditions, and adopt the second transmission mode to transmit the remaining part of the file.

Figure 6:
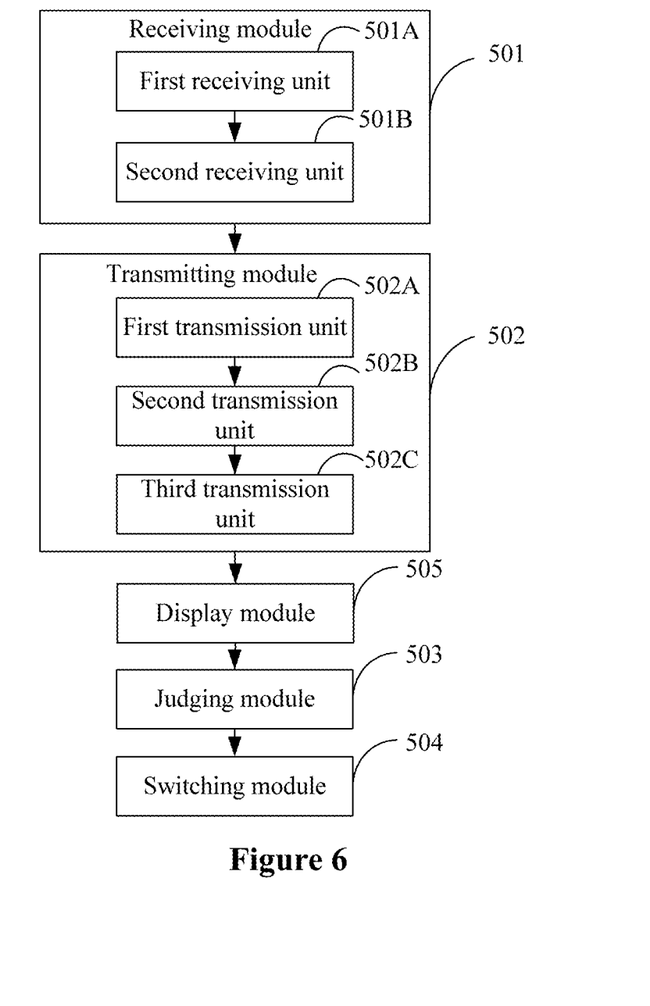
FIG. 6 illustrates a structure diagram of a second mobile device provided in Embodiment III of the present disclosure.

Referring to FIG. 6, in the embodiment, the receiving module 501 includes:

a first receiving unit 501A, configured to detect that the user has pressed a send file button to perform an operation of transmitting the file, and confirm the request for transmitting the file to the second mobile device; or a second receiving unit 501B, configured to detect that the user has touched and dragged the file outside an display area of an screen, judge the operation mode of the file to decide whether it is a sending mode or a browse mode; and on condition that it is the sending mode, confirm the request for transmitting the file to the second mobile device, In the embodiment, the transmitting module 502 includes:

a first transmission unit 502A, configured to use a default transmission mode to transmit a file to a second mobile device;

a second transmission unit 502B, configured to adopt a user's manually selected transmission mode to transmit a file to a second mobile device before the user sends a request; or a third transmission unit 502C, configured to automatically select a transmission mode for the first mobile device and transmit the file to the second mobile device in the transmission mode selected.

Referring to FIG. 6, in the embodiment, the mobile device may further include:

a display module 505, configured to display in real-time the remaining part of the file on the screen during the process of transmitting the file until the file transmission is complete on condition that the file is opened and displayed when the user sends the request.

In the embodiment, preferably, the first transmission mode can be Bluetooth and the second transmission mode can be WIFI or WAPI.

In the embodiment, the judging module 503 is configured to judge in real-time whether the mobile device could keep a connection with the second mobile device, and to judge in real-time whether the size of the remaining part of the file is greater than or equal to the preconfigured threshold.

On condition that the first mobile device could keep the connection with the second mobile device and the size of the remaining part of the file is greater than or equal to the preconfigured threshold, proceed to the step of judging whether the conditions can be satisfied.

On condition that the mobile device disconnects with the second mobile device in the first transmission mode, judge whether it is possible that the mobile device reconnects with a second mobile device in a second transmission mode. If yes, adopt a second transmission mode to transmit the remaining part of the file.

The aforementioned mobile device provided in the embodiment could perform any of the file transmission methods provided in the aforementioned method embodiments. For detailed process please refer to the description in method embodiment, and it will not be discussed again herein.

When transmitting a file in a first transmission mode to a second mobile device, the mobile device provided in the embodiment judges in real-time whether the size of the remaining part of the file is greater than or equal to a preconfigured threshold and whether it is possible to establish a connection in a second transmission mode with the second mobile device with a higher transmission rate than that in the first transmission mode; if yes, switch the transmission mode of the mobile device and adopt the second transmission mode to transmit the remaining part of the file, and thereby improving file transmission efficiency.

In addition, it simplifies the user's operation procedures and provides convenience for the users. Furthermore, the request sent by the user by dragging the opened and displayed file out of the screen to send the file can be supported and a real-time display of the remaining part of the file on the screen which visualizes the process of file transmission for users can also be supported. Therefore, the user experience could be enhanced.

Embodiment IV

The embodiment provides a file transmission system, including a mobile device described above in embodiment III and a second mobile device.

The second mobile device is configured to receive the file sent from the mobile device.

The functions of the mobile device in the embodiment are the same with that in embodiment III, which will not be discussed again herein.

The embodiment is able to perform the methods in any of the aforementioned method embodiments. For detailed process please refer to the description of the method embodiment.

The aforementioned system provided in the embodiment could judge in real-time whether the size of the remaining part of the file is greater than or equal to the preconfigured threshold when transmitting the file to the second mobile device in the first transmission mode, and whether it is possible to establish a connection with the second mobile device in the second transmission mode with a higher transmission rate than that in the first transmission mode; if yes, switch the transmission mode of the mobile device and adopt a second transmission mode to transmit the remaining part of the file. In this way, it improves the file transmission efficiency by selecting the file transmission mode in an intelligent manner according to the size of the remaining part of the file. In addition, it simplifies the user's operation procedures and provides convenience for the users. Furthermore, the request sent by the user by dragging the open and displayed file out of the screen to send the file can be supported and a real-time display of the remaining part of the file on the screen which visualizes the process of file transmission for users can also be supported. Therefore, the user experience could be enhanced.

Embodiment V

The embodiment provides a computer-readable storage medium, which contains one or more programs. These programs could be executed by one or more processors to carry out the methods as follows.

When a first mobile device receives a user's request for transmitting a file to a second mobile device, transmitting the file to the second mobile device in a first transmission mode.

In the process of transmitting the file, judging in real-time whether the size of the remaining part of the file is greater than or equal to a preconfigured threshold.

When the size of the remaining part of the file is greater than or equal to the preconfigured threshold, judging whether the following condition can be satisfied: the first mobile device is able to establish a connection in a second transmission mode with the second mobile device, and the transmission rate of the second transmission mode is higher than that in the second transmission mode.

On condition that the first mobile device satisfies the conditions, switch the transmission mode of the first mobile device and adopt the second transmission mode to transmit the remaining part of the file.

In one mode of execution, the first mobile device receives the request sent by the user for transmitting a file to a second mobile device, including:

when the first mobile device detects that the user has pressed a send file button, judging the user-initiated request for transmitting the file to a second mobile device; or when the first mobile device detects that the user has touched and dragged the file outside a display area of a screen, an operation mode of the file needs to be judged and whether it is sending mode or browse mode needs to be decided; if it is sending mode, the request for transmitting the file to the second mobile device is confirmed.

In another mode of execution, the step of transmitting the file to the second mobile device in the first transmission mode includes:

transmitting the file to the second mobile device in a default transmission mode of the first mobile device; or transmitting the file to the second mobile device in a manually selected transmission mode before the user send the request; or selecting automatically a transmission mode for the first mobile device and transmitting the file to the second mobile device.

In another mode of execution, the method may further include:

displaying in real-time the remaining part of the file on the screen during the process of transmitting the file until the file transmission is complete on condition that the file is open and displayed when the user send the request.

In the embodiment, the first transmission mode can be Bluetooth and the second transmission mode can be WIFI or WAPI.

In another mode of execution, in the process of transmitting the file, judging in real-time whether the size of the remaining part of the file is greater than or equal to a preconfigured threshold, including:

judging in real-time during the process of transmitting the file whether the first mobile device could keep a connection with the second mobile device, and whether the size of the remaining part of the file is greater than or equal to the preconfigured threshold;

on condition that the first mobile device could keep the connection with the second mobile device in the first transmission mode and the size of the remaining part of the file is greater than or equal to the preconfigured threshold, the step of judging whether the mobile device satisfies all the conditions is executed.

In another mode of execution, the method further includes:

on condition that the first mobile device disconnects with the second mobile device in the first transmission mode, judging whether the first mobile device could establish a connection with the second mobile device in the second transmission mode; and on condition that the first mobile device could establish a connection with the second mobile device in the second transmission mode, switching the first transmission mode to the second transmission mode for transmitting the remaining part of the file.

According to another example of the present disclosure, a mobile device is provided, which includes: one or more processors; a memory; and one or more programs stored in the memory and to be executed by the one or more processors, the one or more programs comprise instructions to:

receive a request for transmitting a file to a second mobile device from a user;

transmit the file to the second mobile device in a first transmission mode;

judge in real-time whether the size of a remaining part of the file is greater than or equal to a preconfigured threshold in the process of transmitting the file;

judge whether the first mobile device is able to establish a connection with the second mobile device in a second transmission mode and whether the transmission rate of the second transmission mode is higher than that of the first transmission mode, on condition that the size of the remaining part of the file is greater than or equal to the preconfigured threshold; and switch the transmission mode of the first mobile device to the second transmission mode to transmit the remaining part of the file on condition that the first mobile device is able to establish a connection with the second mobile device in the second transmission mode and the transmission rate of the second transmission mode is higher than that of the first transmission mode.

According to the above embodiments, when transmitting a file to a second mobile device in a first transmission mode, the aforementioned computer-readable storage medium provided in the embodiment judges in real-time whether the size of the remaining part of the file is greater than or equal to the preconfigured threshold, and whether it is possible to establish a connection with a second mobile device in a second transmission mode with a higher transmission rate than that in the first transmission mode; if yes, switch the first transmission mode to the second transmission mode for transmitting the remaining part of the file. In this way, it improves the file transmission efficiency by selecting the file transmission mode in an intelligent manner according to the size of the remaining part of the file. In addition It further simplifies the user operation procedures and provides convenience for the users. Furthermore, the request sent by the user by dragging the open and displayed file out of the screen to send the file can be supported and a real-time display of the remaining part of the file on the screen which visualizes the process of file transmission for users can also be supported. Therefore, user experiences would be enhanced.

It should be noted herein: when the aforementioned file transmission device provided in the embodiments transmits a file, the division of the functional modules is used to illustrate only. In real-life applications, these functions may be assigned to and completed by different functional modules as needed, i.e., divide the internal structure of the apparatus into different functional modules to complete all or part of the aforementioned functions. In addition, the mobile device and file transmission method provided in the aforementioned embodiment relate to the same idea, and the specific implementation process is detailed in method embodiment, which will not be discussed again herein.

The sequence number used to number the aforementioned embodiments of the present invention is for description purpose only, and does not indicate the merits of the embodiments.

All or part of the steps of the embodiments of the present invention may be implemented using software; the corresponding software program may be stored in a readable storage medium, such as a disc or a hard disk.

The aforementioned embodiments of the present invention are preferred embodiments, and are not intended to limit the present invention. Any modifications, equivalent replacement, improvement etc. within the spirit and principles of the present invention shall be included in the scope of protection of the present invention.

What is claimed is:

1. A method for transmitting files performed at a first mobile device, the method comprising:
   receiving a request for transmitting a file to a second mobile device from a user;
   transmitting the file to the second mobile device in a first transmission mode;
   determining whether the first mobile device is able to establish a connection with the second mobile device in a second transmission mode and whether the transmission rate of the second transmission mode is higher than that of the first transmission mode;
   switching the transmission mode of the first mobile device to the second transmission mode to transmit the file on condition that the first mobile device is able to establish a connection with the second mobile device in the second transmission mode and the transmission rate of the second transmission mode is higher than that of the first transmission mode; and
   displaying the remaining part of the file in real-time on a screen in the process of transmitting the file until the entire file transmission is complete;
   wherein receiving the request for transmitting the file to the second mobile device from the user comprises: detecting that the user has touched and dragged the file outside a display area of a screen; judging whether an operation mode of the file is a sending mode or a browse mode; and confirming the request for transmitting the file to the second mobile device is received on condition that the operation mode of the file is sending mode.

2. The method according to claim 1, wherein the method further comprises:
   determining whether the size of the remaining part of the file is greater than or equal to a preconfigured threshold in the process of transmitting the file before switching the transmission mode of the first mobile device to the second transmission mode to transmit the file; and
   proceeding to the process of switching the transmission mode of the first mobile device to the second transmission mode to transmit the remaining part of the file on condition that the size of the remaining part of the file is greater than or equal to the preconfigured threshold, the first mobile device is able to establish a connection with the second mobile device in the second transmission mode and the transmission rate of the second transmission mode is higher than that of the first transmission mode; or
   transmitting the remaining part of the file to the second mobile device in the first transmission mode on condition that the size of the remaining part of the file is less than the preconfigured threshold, the first mobile device is not able to establish a connection with the second mobile device in the second transmission mode, or the transmission rate of the second transmission mode is not higher than that of the first transmission mode.

3. The method according to claim 1, wherein transmitting the file in the first transmission mode to the second mobile device comprises: using a default transmission mode of the first mobile device to transmit the file to the second mobile device.

4. The method according to claim 1, wherein transmitting the file in the first transmission mode to the second mobile device comprises: using a transmission mode manually selected by the user to transmit the file to the second mobile device before the user sends the request.

5. The method according to claim 1, wherein transmitting the file in the first transmission mode to the second mobile device comprises: selecting automatically a transmission mode for the first mobile device to transmit the file to the second mobile device.

6. The method according to claim 1, wherein the method further comprises:
determining whether the first mobile device could establish a connection with the second mobile device in the second transmission mode on condition that the first mobile device disconnects with the second mobile device in the first transmission mode, if yes, switching the transmission mode of the first mobile device to the second transmission mode to transmit the remaining part of the file.

7. A mobile device, wherein the mobile device comprises:
a receiving module, to receive a request for transmitting a file to a second mobile device from a user;
a transmitting module, to transmit the file to the second mobile device in a first transmission mode when the receiving module receives the request;
a judging module, to determine whether the first mobile device is able to establish a connection with the second mobile device in a second transmission mode and whether the transmission rate of the second transmission mode is higher than that of the second transmission mode;
a switching module, to switch the transmission mode of the mobile device to the second transmission mode to transmit the file after the judging module decides that the first mobile device is able to establish a connection with the second mobile device in a second transmission mode and the transmission rate of the second transmission mode is higher than that of the second transmission mode; and
a display module, to display in real-time the remaining part of the file on a screen during the process of transmitting the file until the file transmission is complete;
wherein the receiving module comprises:
a second receiving unit, to detect that the user has touched and dragged the file outside a display area of a screen and judge whether an operation mode of the file is a sending mode or a browse mode; confirm the request for transmitting the file to the second mobile device is received on condition that the operation mode of the file is sending mode.

8. The mobile device according to claim 7, wherein the judging module is further to determine in real-time whether the size of the remaining part of the file is greater than or equal to a preconfigured threshold when the transmitting module transmits the file; and
the switching module is to switch the transmission mode of the mobile device to the second transmission mode to transmit the file after the judging module decides that the first mobile device is able to establish a connection with the second mobile device in a second transmission mode, the transmission rate of the second transmission mode is higher than that of the second transmission mon, and the size of the remaining part of the file is greater than or equal to the preconfigured threshold.

9. The mobile device according to claim 7, wherein the transmitting module comprises:
a first transmission unit, configured to transmit the file to the second mobile device in a default transmission mode of the first mobile device.

10. The mobile device according to claim 7, wherein the transmitting module comprises:
a second transmission unit, configured to transmit the file to the second mobile device in a transmission mode manually selected by the user before the user sends the request.

11. The mobile device according to claim 7, wherein the transmitting module comprises:
a third transmission unit, configured to automatically select a transmission mode for the first mobile device and transmit the file to the second mobile device in the transmission mode selected.

12. The mobile device according to claim 7, wherein the judging module is further to judge whether the first mobile device could establish a connection in the second transmission mode with the second mobile device when the first mobile device disconnects with the second mobile device;
the switching module is further to switch the transmission mode of the mobile device to the second transmission mode to transmit the remaining part of the file on condition that the mobile device could establish a connection with the second mobile device in the second transmission mode.

13. A mobile device, comprising:
one or more processors;
a memory; and
one or more programs stored in the memory and to be executed by the one or more processors, the one or more programs comprise instructions to:
detect that a user has touched and dragged a file outside a display area of a screen;
judge whether an operation mode of the file is a sending mode or a browse mode;
confirm a request for transmitting the file to the second mobile device is received on condition that the operation mode of the file is sending mode;
transmit the file to the second mobile device in a first transmission mode;
judge whether the first mobile device is able to establish a connection with the second mobile device in a second transmission mode and whether the transmission rate of the second transmission mode is higher than that of the first transmission mode;
switch the transmission mode of the first mobile device to the second transmission mode to transmit the remaining part of the file on condition that the first mobile device is able to establish a connection with the second mobile device in the second transmission mode and the transmission rate of the second transmission mode is higher than that of the first transmission mode; and display the remaining part of the file in real-time on a screen in the process of transmitting the file until the entire file transmission is complete.

14. A non-transitory computer-readable storage medium, comprising a set of instructions for transmitting files, the set of instructions to direct at least one processor to perform acts of:
- detecting that a user has touched and dragged a file outside a display area of a screen;
- judging whether an operation mode of the file is a sending mode or a browse mode;
- confirming a request for transmitting the file to the second mobile device is received on condition that the operation mode of the file is sending mode;
- transmitting the file to the second mobile device in a first transmission mode;
- judging whether the first mobile device is able to establish a connection with the second mobile device in a second transmission mode and whether the transmission rate of the second transmission mode is higher than that of the first transmission mode;
- switching the transmission mode of the first mobile device to the second transmission mode to transmit the remaining part of the file on condition that the first mobile device is able to establish a connection with the second mobile device in the second transmission mode and the transmission rate of the second transmission mode is higher than that of the first transmission mode; and
- displaying the remaining part of the file in real-time on a screen in the process of transmitting the file until the entire file transmission is complete.

* * * * *